June 23, 1936.　　　H. W. CLUTE　　　2,045,261
PUSH-PULL LINK TRANSMISSION
Filed Feb. 18, 1935
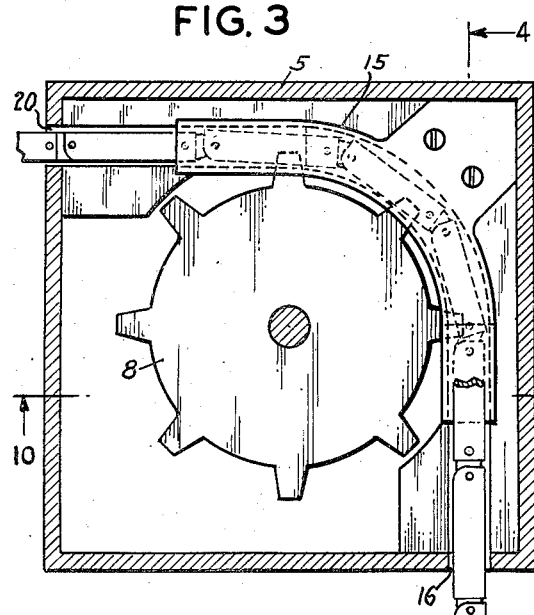
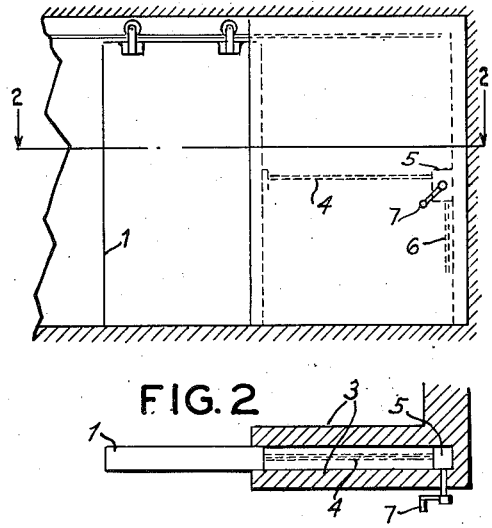
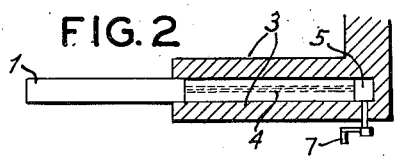
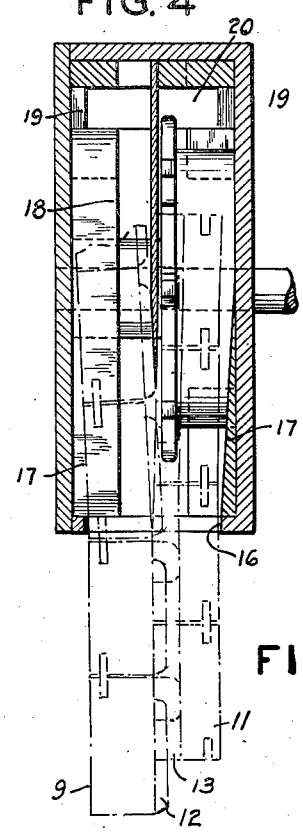
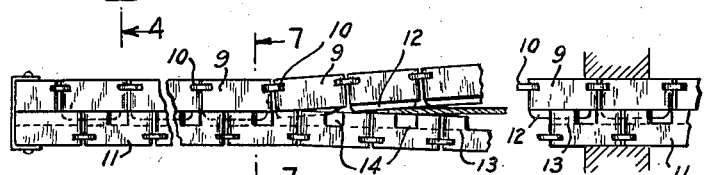
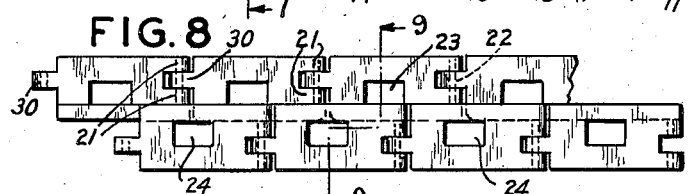
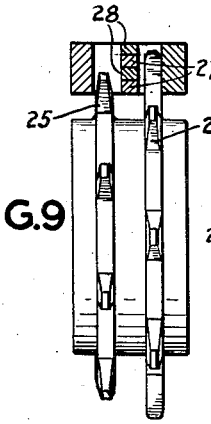
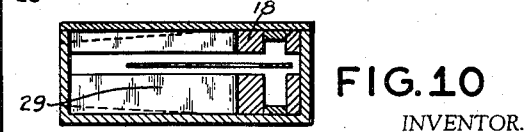
INVENTOR.
Harry W. Clute
BY
Thomas Howe
ATTORNEY.

Patented June 23, 1936

2,045,261

UNITED STATES PATENT OFFICE 2,045,261

PUSH-PULL LINK TRANSMISSION

Harry W. Clute, Irvington, N. Y.

Application February 18, 1935, Serial No. 7,057

12 Claims. (Cl. 254—95)

This invention relates to chains which may not only transmit the usual pull whereby the chain is placed under tension, but also will transmit an endwise push whereby the chain is placed under endwise compression, the ordinary chain being incapable of transmitting such push but collapses under its exertion.

The main object of the invention is to produce an improved device of the character referred to.

A further object of the invention is to provide such a device adapted to be rendered flexible at desired points.

A further object of the invention is to provide a device which may be flexed about a guiding or driving wheel such as a sprocket, pulley or the like, while maintaining its characteristics as referred to, as a whole.

A further object of the invention is to provide means for acting upon the chain to change it from a flexible to an inflexible condition.

A further and more specific object of the invention is to provide a chain comprising a plurality of series of pivoted links, the links of different series engaging together to prevent flexing of the chains, the chain being permitted to flex when the series of links have been separated from each other so as to be moved out of co-operative relation.

A further object of the invention is, in connection with a character of chain as described, to provide a driving or guiding wheel, such as a sprocket wheel or pulley, and adjacent to the wheel a means for separating the series of links so that the chain may flex about the wheel.

Other and ancillary objects of the invention will appear hereinafter.

In the accompanying drawing which illustrates the invention—

Fig. 1 is an elevational view showing a sliding or rolling door and the device of the present invention applied thereto;

Fig. 2 is a section on the line 2—2 of Fig. 1;

Fig. 3 is a side view, the casing being shown in section, of a device embodying the invention as applied in Fig. 1 but on an enlarged scale and with the link series partly broken away;

Fig. 4 is a section on the line 4—4 of Fig. 3, the upper part of the sprocket engaging link series, being omitted;

Fig. 5 is a side elevation of a portion of the chain viewed from the right of Fig. 3 showing its entry upon its turn about the sprocket wheel;

Fig. 6 is a plan view of the portion of the chain where it is leaving the casing, the adjacent casing being shown in section;

Fig. 7 is a section on the line 7—7 of Fig. 5;

Fig. 8 is a face view of a section of a modified form of chain, adapted for use with a plurality of rows of sprockets, one for each series of links;

Fig. 9 is a section of the chain on the line 9—9 of Fig. 8 with a double row sprocket wheel to which it is applied;

Fig. 10 is a section, on a reduced scale, on the line 10—10 of Fig. 3 but with a stationary curved guide substituted for the sprocket wheel and the chain being omitted.

Referring to the drawing and first to Figs. 1 to 7 inclusive, Figs. 1 and 2 illustrate the application of the invention to the operation and holding of a sliding or rolling door, such as a door for a garage or the like. The door 1 is hung by means of rollers from a suitable straight track upon which the door may be moved outwardly to close the door or may be slid inwardly between the building walls 3 to open the door. Located between the walls and secured at one end to the door is the device embodying the invention comprising a chain 4 which extends through the casing 5 about a sprocket wheel and has another portion 6 outside the casing. The sprocket wheel which engages with the chain may be turned by a handle 7 or other suitable means to advance the chain in one direction or the other, the chain being stiff and inflexible between the casing 5 and the door whereby it may act as a prop to hold the door in desired position against either direction of movement. The chain is also stiff at 6 at the other side of the casing, but within the casing means are provided which render the chain flexible where it passes about the sprocket wheel.

The construction whereby these results are accomplished will now be described.

Within the casing 5 is rotatably mounted the sprocket wheel 8. Engaging with the sprocket wheel is a chain comprising the series of links 9 the adjacent links being pivoted together by means of plates 10 entering into recesses in the links and having pins passing through their ends and into the links. The chain also comprises the series of links 11 similarly pivoted together, the two series of links being parallel lying and each of the links 9 being provided with a tongue 12 adapted to fit into corresponding grooves 13 in the links 11. It will be seen that the pivots of the links of the two series are staggered so that when the chains are in proximity the tongues 12 of one series of links will enter within the grooves 13 of the other series, the tongue of a link of one series engaging in the grooves of two adjacent links of the other series. In both the series the links will thereby be prevented from turning about their pivots and the chain will be substantially stiff and inflexible. If, however, the two series of links are separated in a direction substantially parallel to the axes of the link pivots, the tongues 12 will be removed from the grooves 13 when both series of links may turn about their pivots, and the chain is rendered flexible. It will also be observed that in the links 11 are formed holes 14 for engaging sprocket teeth.

The chain as thus described is passed through the casing 5, there being fixed to the casing a curved wedge piece 15 which is interposed between the two series of pivoted links and separates them so that the tongues on certain of the links are removed from the grooves in the adjacent series of links whereby the chain is permitted to flex about the sprocket wheel, the teeth of the sprocket entering holes 14. It will be observed that the wedge piece 15 is thin and tapers to a sharp edge at each end. The chain passes through the opening 16 in the casing which is of such lateral dimensions as to hold the two linked series in close proximity with the tongues of one series engaging the grooves of the other, and this condition prevails outside that opening so that section of the chain is stiff and inflexible. Within the casing, however, tapering walls 17 permit the wedge to separate the chain series and allow both series, that is the chain as a whole, to flex, the link series without the sprocket holes being guided by the curved guide piece 18. After passing about the sprocket, the two sections will then be caused to converge by means of the tapered walls 19, so that the two link series are guided together and on emerging from the opening 20 in the casing are in close proximity with the tongues and grooves in engagement so that the chain is substantially stiff and inflexible.

It will now be seen that the chain at all points outside the casing is stiff but that the two link series are separated so as to be disengaged and are therefore flexible to pass about the axis of the sprocket wheel, one of the series being in engagement therewith and the other passing about a curved guide as described. The chain may be moved in either direction by pulling upon it at either side of the casing or, by reason of its inflexible character, it may be moved in either direction by pushing upon it in the direction desired, this push operating to move the chain on account of its inflexibility rather than to cause its collapse as with the usual chain.

In Figs. 8 and 9 is shown a similar form of chain but modified in that the pivoting between each of the two links is accomplished by a lug 30 on one of the links entering in a recess between the two lugs 21 of the adjacent link, and a pin 22 is passed through all three of the lugs after the manner of a hinge. Also each of the link series is provided with sprocket openings instead of only one of the series being so provided, the one of the link series having the sprocket openings 23 and the other having the sprocket openings 24.

To provide for sprocket engagement with both of the series of links, a double sprocket wheel having the two rows of sprockets 25 and 26 is provided, the one row of sprocket teeth being staggered with relation to each other to correspond with the staggered relation of the sprocket holes in the link series. Also the engagement of the links of the different series is brought about by two tongues 27 on one series of links entering the recesses or grooves formed by the double tongues 28 of the other. This forms a peculiarly strong and firm connection, and also it will be observed that the links will always go together whenever the grooved and tongue faces of the link series are presented to each other without any special relative arrangement of the linked series.

It may be desirable, that instead of providing a sprocket for guiding or driving the chain, the chain be simply pushed or pulled. When this is the case the sprocket 8 may be substituted by a curved guide 29 (see Fig. 10) of a similar curvature to the guide 18. The chain may then be pushed through the channel in the casing, being supported about the curve by the guides 18 and 29. The chain would then be simply pushed or pulled through the casing, being separated at the curve by the separator 15, being thus rendered flexible where it turns about the curve in conformity with the guides and being inflexible outside the casing.

While the invention has been illustrated in what are considered its best applications it may have other embodiments without departing from its spirit and is not limited to the structures shown in the drawing.

What I claim is:

1. A push-pull chain comprising in combination a plurality of parallel lying series of links, the links of each of the series being pivoted together and means for engaging said series of links to prevent turning about said pivots, said means being moved into and out of engaging position by relative movement of the different series toward and away from each other in a direction substantially parallel to said pivots.

2. A push-pull chain comprising in combination a plurality of parallel lying series of links, the links of each of the series being pivoted together and the links of all the series being turnable in the same direction about their pivots when the series are separated and means for engaging said series of links to prevent turning about said pivots, said means being moved into and out of engaging position by relative movement of the different series toward and away from each other in a direction substantially parallel to said pivots.

3. A push-pull chain comprising in combination a plurality of parallel lying series of links, the links of each of the series being pivoted together and means for engaging said series of links to prevent turning about said pivots, said means being moved into and out of engaging position by relative movement of the different series toward and away from each other in a direction substantially parallel to said pivots and means for separating one series of links from another.

4. A push-pull chain comprising in combination a plurality of parallel lying series of links, the links of each of the series being pivoted together and means for engaging said series of links to prevent turning about said pivots, said means being moved into and out of engaging position by relative movement of the different series toward and away from each other in a direction substantially parallel to said pivots and means for moving the link series from a separated non-cooperating relationship into an engaging cooperating relationship.

5. A push-pull chain comprising in combination a plurality of parallel lying series of links, the links of each of the series being pivoted together and means for engaging said series of links to prevent turning about said pivots, said means being moved into and out of engaging position by relative movement of the different series toward and away from each other, means for guiding the link series into engaging cooperative relationship, means for separating them into non-cooperating relationship and means for again moving them together into an engaging cooperating relationship, said separating means separating the links between said guiding and moving means.

6. A push-pull chain comprising in combination a plurality of parallel lying series of links, the links of each of the series being pivoted together and means for engaging said series of links to prevent turning about said pivots, said means being moved into and out of engaging position by relative movement of the different series toward and away from each other in a direction substantially parallel to said pivots and means for separating one series of links from another and a wheel about which said chain turns, said wheel being adjacent to said means for separating said link series.

7. A push-pull chain comprising in combination a plurality of parallel lying series of links, the links of each of the series being pivoted together and means for engaging said series of links to prevent turning about said pivots, said means being moved into and out of engaging position by relative movement of the different series toward and away from each other and means for separating one series of links from another and a sprocket wheel engaging with said chain and about which said plurality of series of links of said chain turns, said wheel being adjacent to said means for separating said link series.

8. A push-pull chain comprising in combination a plurality of parallel lying series of links, the links of each of the series being pivoted together and means for engaging said series of links to prevent turning about said pivots, said means being moved into and out of engaging position by relative movement of the different series toward and away from each other and means for separating one series of links from another and a sprocket wheel having a plurality of rows of sprocket teeth respectively engaging said link series, said plurality of series of links of said chain turning about said wheel and said wheel being adjacent to said means for separating said link series.

9. The combination with a plurality of links pivoted together, of means engaging said links to prevent relative turning about their pivots, said means being moved into and out of engaging position by relative movement of said means and said plurality of links toward and away from each other in a direction substantially parallel to said pivots and means located along the path of the chain for disengaging said links from the aforesaid means so that the links may relatively turn about their pivots.

10. The combination with a plurality of links pivoted together, of means engaging said links to prevent relative turning about their pivots, said means being moved into and out of engaging position by relative movement of the said means and said plurality of links toward and away from each other in a direction substantially parallel to said pivots, means located along the path of the chain for disengaging said links from the aforesaid means so that the links may relatively turn about their pivots and means for again engaging said links and the first mentioned means to prevent relative turning of the links about their pivots.

11. A push-pull chain comprising in combination a plurality of parallel lying series of links, the links of each of the series being pivoted together and means for engaging said series of links to prevent turning about said pivots, said means being moved into and out of engaging position by relative movement of the different series toward and away from each other in a direction substantially parallel to said pivots, the links of one series each engaging with two links of the other series to prevent relative turning of the links about their pivots.

12. A push-pull chain comprising in combination a plurality of parallel lying series of links, the links of each of the series being pivoted together and tongue and groove connections between the links of the different series to prevent turning of the links about their pivots, said connections being moved into and out of engaging position by relative movement of the different series toward and away from each other in a direction substantially parallel to said pivots.

HARRY W. CLUTE.